United States Patent [19]

De Buyl et al.

[11] Patent Number: 4,817,062
[45] Date of Patent: Mar. 28, 1989

[54] METHOD FOR ESTIMATING SUBSURFACE POROSITY

[75] Inventors: Marc H. De Buyl, Katy; Thomas M. Guidish, Houston, both of Tex.

[73] Assignee: Western Atlas International, Inc., Houston, Tex.

[21] Appl. No.: 104,759

[22] Filed: Oct. 2, 1987

[51] Int. Cl.⁴ .......................... G01V 1/00; G01V 1/30
[52] U.S. Cl. ...................................... 367/73; 364/421; 367/57
[58] Field of Search ................... 367/25, 73, 57, 59; 364/421, 422

[56] References Cited

U.S. PATENT DOCUMENTS 3,883,841  5/1975  Norel et al. ........................ 367/25
4,679,174  7/1987  Gelfand ............................. 367/73

OTHER PUBLICATIONS

"Resevoir Delineation and Porosity Evaluation from VSP," SPE Unconsolidated Pap #SPE-16462 (May '87).

"Predicting Pore Pressure and Porosity from VSP Data," Annu AAPG-SEPM-EMD-DPA Conv. (San Antonio, 5/84).

Primary Examiner—Thomas H. Tarcza
Assistant Examiner—Ian J. Lobo
Attorney, Agent, or Firm—Barry C. Kane

[57] ABSTRACT

The instant invention is a method for accurately estimating the subsurface porosity and porosity-thickness of an interval of interest. A seismic acoustic model is constructed from data collected in a seismic survey. The acoustic model provides information from which predicted porosity values may be calculated. The predicted porosity valves are then cross-plotted with actual porosity valves obtained from well information, providing an accurate estimate of porosity away from the well locations. Porosity thickness is determined using the thickness information provided by the well data.

5 Claims, 6 Drawing Sheets

METHOD FOR ESTIMATING SUBSURFACE POROSITY

BACKGROUND OF THE INVENTION

1. Field of the Invention

The instant invention relates to seismic exploration and more particularly to a method for estimating subsurface petrophysical parameters such as porosity from seismic reflection data.

2. Description of the Related Art

Historically, three-dimensional descriptions of hydrocarbon-bearing reservoirs were based primarily on the interpolation between borehole locations of well-log and core analysis data. The well-log data and core analysis were particularly useful in determining at each well location the thickness, porosity and permeability of subsurface units which act as a reservoir for economic fluids, such as oil or gas. Optimum development and production drilling between or away from existing well locations cannot be achieved using the above approach. Often, the costs involved in drilling a well may not be justified when considering the risks involved with a poorly defined subsurface reservoir.

The advent of seismic exploration provided an unparalleled tool for determining subsurface structure. As is generally well known, a seismic signal of limited frequency range may be generated in the earth. A portion of the signal propagates downwardly and is reflected by the structural and lithologic changes in the subsurface. The reflected signals arriving at the surface are detected by sensors coupled to the earth in a predetermined pattern. The early seismic recordings or "seismograms" were crude compared to the records collected today. Despite the great advances in exploration, petrophysical particulars of hydrocarbon reservoirs, such as porosity and permeability, are not detectable using seismic exploration alone. Seismic data only provide a general illustration of the subsurface structure and of gross lithologic and fluid changes.

Of the techniques mentioned above, none have proven to be satisfactory and there remains a longstanding need within the industry for a method to readily determine subsurface structure as well as gross lithologic and fluid changes.

SUMMARY OF THE INVENTION

It is an object of this inventive method to provide a better definition of a subsurface reservoir using seismic data.

Another object of this invention is to reliably estimate the average porosity of subsurface intervals between well locations.

It is another object of this invention to provide an estimate of the pore volume in the subsurface region of interest.

The objects of the instant invention may be accomplished by the instant invention wherein the initial step includes conducting a seismic survey over the area of interest. Well-log data are acquired from the subsurface interval of interest. The well data may include cores, sonic logs, resistivity logs, and self-potential logs as well as other types of information to substantially identify petrophysical parameters of the interval of interest.

The well data are combined with seismic data to obtain a lithologic model of the subsurface. This lithologic model and well data provide detail information as to the lateral as well as vertical acoustic impedance changes of the interval of interest. The seismically-derived acoustic impedance data and other variables determined from the well data may be interrelated to determine the porosity of the subsurface interval.

Most inversion processing techniques internally invoke a deterministic or arbitrary density-velocity relationship in extracting velocity information from seismic traces. In turn, porosity calculation is based on the application of Wyllie's time-average equation to these derived velocities.

However, since the relationship between the velocity and density depends on both lithology and the age of the sediments, no single relationship can be applied safely to the entire section to accurately calculate velocity. Notwithstanding the shortcomings of the time-average equation, this simplistic determination of porosity from inferred velocity data is suspect because of unaccounted vertical and lateral changes in the density-velocity relationship.

Accordingly, a porosity-acoustic impedance ($v\rho$) equation was developed from a combination of the time-average and porosity-density equations.

Although this approach does not alleviate the effect of lateral lithologic variation on the accuracy of porosity estimations, it enables subsequent adjustment to porosity, based on external information provided by new data about lithologic changes across the area of interest and using site-specific rock matrix properties.

The porosity determined from the seismic lithologic model may be calibrated with data from the well locations resulting in gross and net porosity determinations.

BRIEF DESCRIPTION OF THE DRAWINGS

A better understanding of the benefits and advantages of my invention may be obtained from the appended detailed description and the drawings, wherein.

DETAILED DESCRIPTION OF THE PREFERRED EMBODIMENTS

Figure 1:
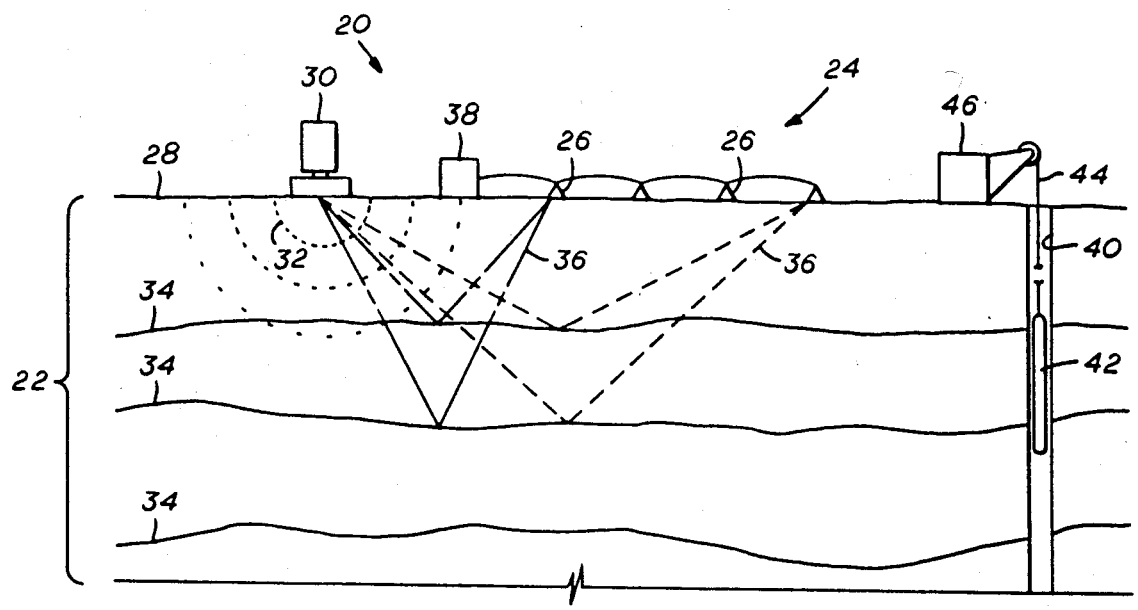
FIG. 1 is a generalized cross section of the earth showing several subsurface layers detected by geophysical surveying and by well log analysis.

It shall be understood that the following inventive method may be used in conjunction with several different methods of deriving an acoustic impedance model of the subsurface. Such acoustic impedance modeling techniques are disclosed by R. O. Lindseth in volume 44, number 1 of Geophysics, pages 3–26, 1979, and incorporated herein by reference. Another such modeling technique is described by D. W. Oldenburg et al., in volume 48, number 10 of Geophysics, pages 1318–1337, 1983, also incorporated herein by reference. The Lindseth technique is accomplished using a one-dimensional recursive inversion method and Oldenburg et al., uses a sparse-spike deconvolution method.

Another method of deriving an acoustic impedance model is the Seismic Lithologic Modeling technique (SLIM TM) developed by the assignee of this invention and is the technique which will be described with respect to the instant invention.

In one embodiment of the instant invention, a seismic survey 20 is commonly conducted above an area of interest. If already available, seismic data from a previous survey may be used if the parameters of the survey meet the user's guidelines. If not, then a new seismic survey must be conducted.

The goal of the seismic survey, such as the one generally indicated as 20 in FIG. 1, is to obtain and display a representation of the subsurface structure 22. Usually, to achieve this goal, an array 24 of seismic sensors 26 may be positioned along a line or grid of observation stations on the surface of the earth 28. An acoustic source 30, such as a vibrator or charge of dynamite, may be stationed in the vicinity of the sensor array 24 at a predetermined location. The acoustic source 30 may generate an acoustic signal 32 of pretermined frequency in the earth for a specified period of time. The acoustic signal 32 radially propagates into the earth and is reflected back to the surface 28 by various subsurface strata and structures such as 34. The reflected acoustic signals 36 arrive at the surface 28 and are detected by the array 24 of sensors 26 and passed to a remote recording device 38 for later processing. The sensor array 24 and acoustic source 30 may then be moved to a new location and the process repeated. It is understood that the seismic survey may be either a two-dimensional or three-dimensional survey and a three-dimensional survey is preferred with respect to this method.

The area of interest under the survey should be pierced by at least one borehole, such as the one shown in the right hand portion of FIG. 1 and identified as numeral 40. Although only one borehole in the Figure is shown, it is preferred that several wells be contained within the survey area. Borehole 40 should penetrate to a depth at least as great as the depth containing the interval of interest. During the drilling of the borehole 40, core samples may be taken over a range of depths for later use discussed below. After drilling of the borehole is complete, it may be logged using a variety of tools to determine the rock type, the thickness and percentages of each rock type, and the presence of hydrocarbons and any other parameters desired. The data are usually collected by means of a sonde 42 lowered into the borehole 40 by a cable 44 coupled to a recording device 46 at the surface 28.

Figure 2:
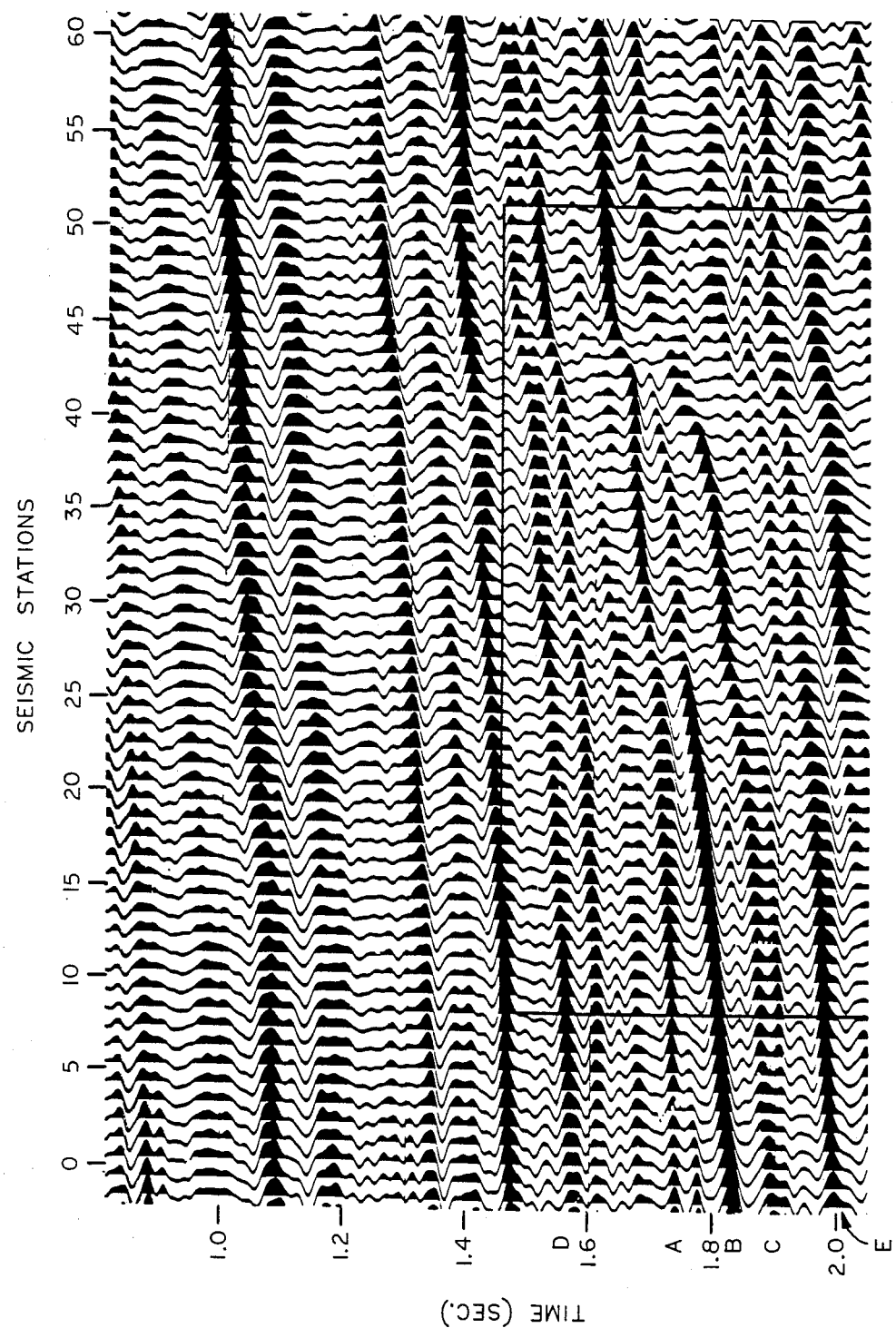
FIG. 2 is a typical section of seismic traces.

Seismic data collected during the seismic survey 20 may be recorded in the form of a sequence of spatially-distributed, seismic time-scale traces as gathered by the seismic sensors 26 and recorded by device 38. Each trace may be drawn vertically as a function of two-way travel time beneath the seismic station where it originated. FIG. 2 is an example of a seismic section 48 containing processed seismic traces. Seismic station numbers are marked at the top of the section along a horizontal axis. Intervals of two-way travel time are marked in seconds along the vertical axis at the left margin.

Figure 3:
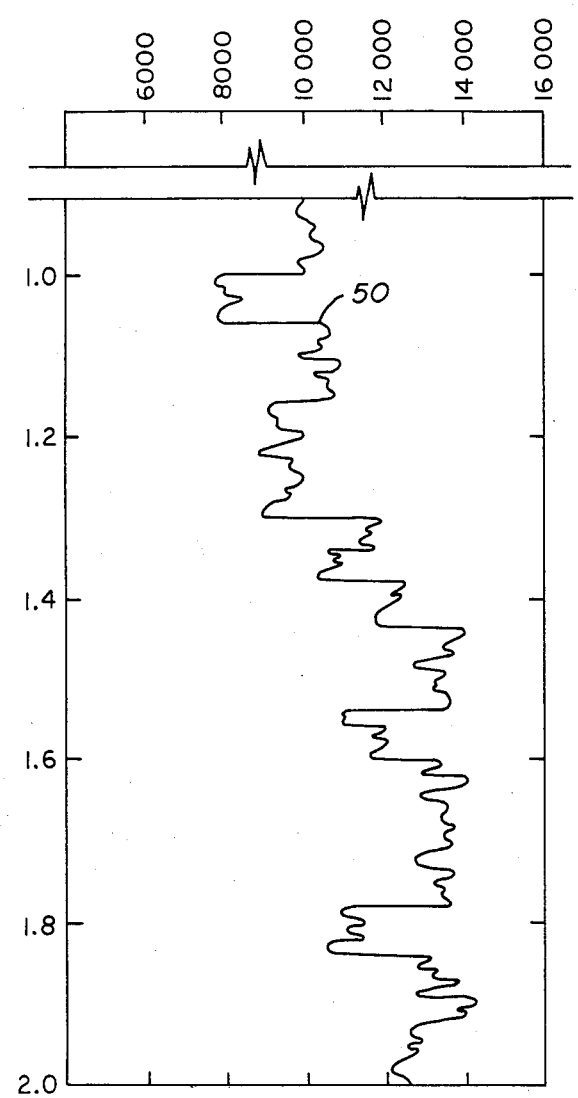
FIG. 3 represents a sonic log derived from a bore hole.

FIG. 3 is an example of a velocity log 50 which may be routinely collected from a borehole such as 40. In the Figure, the vertical-depth domain has been converted to the vertical-time domain with the time scale in two-way travel time. The more prominent reflections on the seismic section 48 should approximately correspond to gross excursions on the sonic log 50.

As is well known in the art of geophysics, the frequency spectrum of any layered earth model contains all frequencies from DC to infinity. For all practical purposes, it may be assumed that 99 percent of the seismic energy is contained within frequencies less than 200 Hertz (Hz). Seismic data are band limited and therefore the informative part of the seismic-energy spectrum is practically bound from about 5 Hz to 70 Hz, thus a very large part of the frequency spectrum is lost. The lost portion of the frequency spectrum may not be recovered by any kind of linear transformation from a seismic-time section to a depth model.

From the seismic data collected at the survey site 20 combined with the data from the borehole 40, a lithologic model may be created that replaces some of the missing spectrum. In this embodiment, the preferred seismic lithologic modeling process is described in U.S. Pat. No. 4,679,174 assigned to the assignee of this invention and is incorporated herein by reference.

The lithologic modeling process involves two stages: (1) a large-scale seismic data analysis based on principles of gross-structure and stratigraphy; and (2) a detailed analysis of a restricted portion of the large-scale structure. The first stage is simply a structural interpretation of a seismic cross section as is routinely done by geophysicists. Within the gross structural section, there may be a local zone of interest embracing an interval that requires detailed scrutiny. Items of interest include the definition of fluid content and anticlines, stratigraphic traps, facies changes, and the like. Attention will be directed to the second stage of the process.

In the seismic lithologic modeling method, a synthetic seismic section is initially created based upon a geological hypothesis from the region embracing the interval of interest. Creation of the hypothesis is not based on seismic data alone. General knowledge of the geology of the area may influence the initial hypothesis. If one or more boreholes are available within the area, sonic logs, resistivity logs, self-potential logs, and the like should all contribute input to the geological hypothesis in addition to the seismic data.

Figure 4:
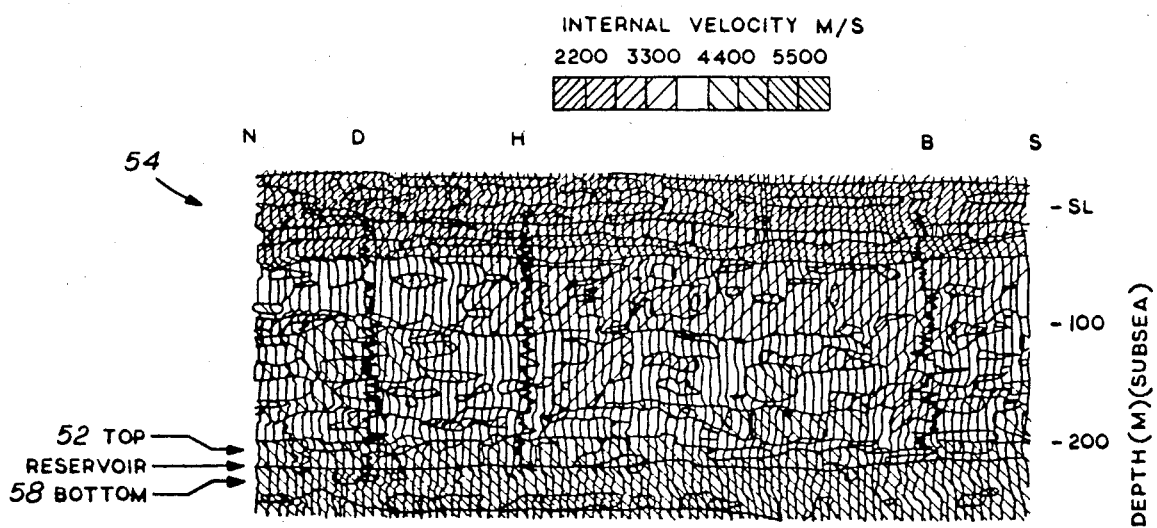
FIG. 4 is an example of a lithologic model derived from seismic and well data.

The seismic lithologic modeling process may be applied to the synthetic section to derive a thin-layered acoustic model 54 of the subsurface. The modeling method is a process in which the response of the iteratively perturbed traces of the synthetic section converge toward the recorded seismogram 48 shown in FIG. 2. Unlike some inversion methods that simply transform amplitudes into pseudo-velocity data, the seismic lithologic modeling technique is a forward process in which two-dimensional, layered-model parameters (interval velocity, density and thickness) are varied one at a time at predetermined locations. The purpose of this process is to improve the match between the model-derived synthetic traces and the stacked and migrated seismic traces 48. This parameter-perturbation process is performed over several iterations through the full set of model parameters. When a satisfactory match is obtained between the resulting synthetic and recorded data traces, the modeling process is terminated. An example of a seismic lithologic model (acoustic model) is shown in FIG. 4. For a further treatment of the modeling process, the reader is referred to Appendix B and the above cited U.S. patent.

After deriving the acoustic model shown in FIG. 4, the top 52 and base 58 of the reservoir zone are identified at the well intersections through correlation with the wireline logs. The top and base of the reservoir are mapped spatially throughout the seismic survey area, correlating the interpretation with all available well control. Once the top and base of the reservoir are mapped at each seismic location, the average impedance across the reservoir interval can be calculated at each well location. A map of average reservoir impedance and reservoir thickness may then be produced showing the spatial variability of these parameters across the interval. The map of reservoir impedance may then be used to produce a reservoir porosity map. However, because acoustic impedance depends primarily on four variables—lithology, porosity, fluid content and pore pressure—well data are needed to constrain three of the above parameters to extract estimates of the fourth from seismic data. The well-data information needed is primarily rock composition and fluid-type variations. These parameters are collected at each of the well locations located across the study area. These parameters are mapped, then digitized and gridded to provide a value at each seismic trace location where the acoustic impedance across the reservoir has been averaged.

To derive the porosity map we derive a porosity-acoustic impedance relationship to transform the impedances directly into porosity. The relationship is a combination of the "time-average" and "density-average" equations with shale correction adapted to acoustic impedance. This relationship can be solved for porosity. The details of this derivation can be found in Appendix A. The expression for correlating acoustic impedance to porosity can be generalized for a two constituent rock compostion as:

$$\phi = \frac{(1 - V_2)(\rho_1 - \rho v \Delta t_1) + V_2(\rho_2 - \rho v \Delta t_2)}{\rho v (\Delta t_f - \Delta t_1) - (\rho_f - \rho_1)}, \quad (1)$$

where
$\phi$ = porosity
$V_2$ = percentage of minor constituent
$\rho_1$ = density of major constituent
$\Delta t_1$ = transit time of major constituent
$\rho_2$ = density of minor constituent
$\Delta t_1$ = transit time of minor constituent.
$\rho v$ = average acoustic impedance
$\rho_f$ = fluid density
$\Delta t_f$ = fluid transit time.

The density and the transit time of the constituent matrices, as well as the percentage of the minor rock matrix constituent, all are derived from the mapped well information.

Figure 5:
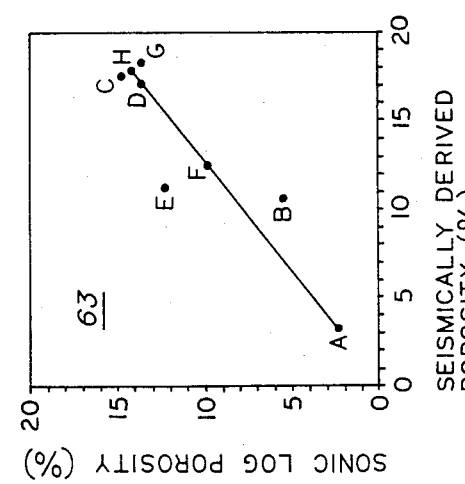
FIG. 5 is an example of a least-squares-regression analysis between seismically-derived gross-porosity and well-derived porosity.

A seismically-derived gross-porosity value can be extracted for the reservoir zone at each trace location using the above equation (1) and area-specific data as outlined above. The seismically-derived gross-porosity data provide information concerning relative changes of porosity across the survey area. However, these seismically-derived porosities must be calibrated with the porosities measured from the log and core analysis taken from the available well control. This can be done with a variety of techniques; the simplest of which is a least-square-regression analysis 63 shown in FIG. 5 between the seismically-derived gross-porosities and the well-derived porosities.

Figure 6:
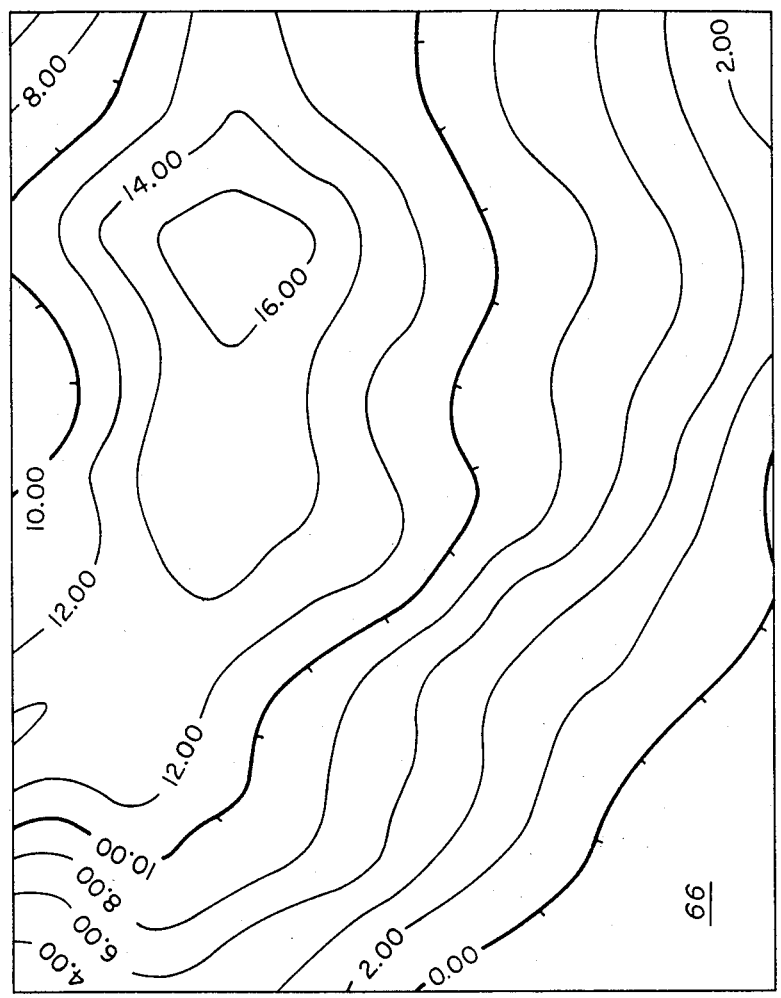
FIG. 6 illustrates a gross-porosity map of the interval of interest after calibration.

The least-square-regression formula may be applied at each seismic location resulting in a well-calibrated seismically-derived gross-porosity map 66 as illustrated in FIG. 6. The porosity map can then be used to map the spatial porosity distribution of the reservoir in much more detail than available from well control alone.

While the porosity map has many uses, the parameter of primary interest to the reservoir engineer is the pore volume. This value is necessary for computing the total pore space in the reservoir as well as its spatial distribution which may contain hydrocarbons and is calculated by multiplying the porosity by the reservoir thickness. This product is called a gross-porosity thickness. The more useful value is the net-porosity thickness. Net porosity thickness is the amount of pore volume above a certain porosity cutoff that can effectively contribute to the reservoir production.

Using the seismic information collected earlier, the gross-porosity thickness is a straightforward calculation. The product of the well-calibrated, seismic-gross porosity is multiplied by the thickness of the interval from the acoustic model interpretation. This step, performed at each location, may result in a gross pore-volume map across the survey area.

Figure 7:
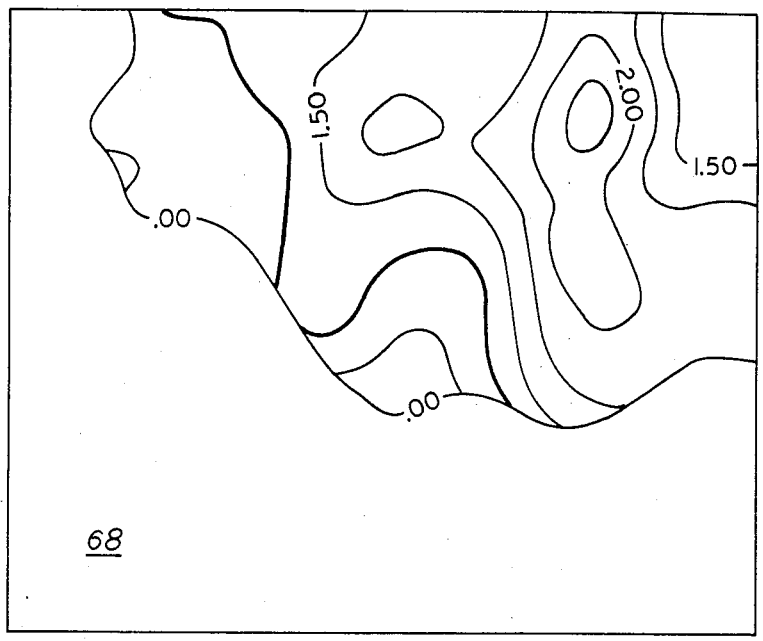
FIG. 7 is a map illustrating net-porosity thickness of the interval of interest.

To achieve a net pore-volume map is somewhat more difficult. Since we are only measuring gross reservoir properties, net porosity thickness as defined in reservoir engineering, is not a directly measurable parameter because seismic resolution does not allow calculation of net properties on a foot-by-foot basis as does well-log data. However, using the well information, a gross-to-net calibration can be applied to convert the gross pore-volume map to a net pore-volume map. This calibration can be done in a variety of ways, but generally is done by the least-square-regression analysis of seismic gross-porosity thickness at the available well control, cross plotted against well-derived net-porosity thickness. Applying this calibration factor to each location results in a net-porosity thickness map 68 as shown in FIG. 7. This net pore-volume map is then used to calculate oil in place, and plan future development. Compared with the well spacing, the additional spatial control provided by the seismic information will provide additional details of the pore volume distribution allowing more accurate description of the reservoir and more jubicious infil drilling.

For illustrative purposes, our invention has been described with a certain degree of specificity. Variations will occur to those skilled in the art but which ma be included within the scope and spirit of this invention which is limited only by the appended claims.

APPENDIX A

The porosity-time-average equation with shale correction is written as:

$$\Delta t = (1 - \phi - V_{sh})\Delta t_{ma} + (V_{lam} + V_{str})\Delta t_{lam} + (\phi + - V_{dis})\Delta t_f, \quad (A.1)$$

where
$\Delta t$ = measured transit time
$\phi$ = porosity
$V_{sh}$ = total percentage of shale
$\Delta t_{ma}$ = matrix transit time $V_{lam}$=percentage of laminar shale
$V_{str}$=percentage of structural shale
$\Delta t_{lam}$=laminar shale transit time
$V_{dis}$=percentage of dispersed shale
$\Delta t_f$=fluid transit time.

Therefore, with $$V_{sh}=V_{lam}+V_{str},$$

and neglecting $V_{dis}$, Equation (A.1) becomes $$\Delta t=(1-\phi-V_{sh})\Delta t_s+V_{sh}\Delta t_{sh}+\phi\Delta t_f \quad (A.2)$$

where
 $\phi$=porosity
 $\Delta t_s$=sand matrix transit time
 $\Delta t_{sh}$=shale matrix transit time.
Similarly, the porosity-density equation with shale correction is written as:

$$\rho_b=\phi(S_{xo}\rho_{mf}+S_{hr}\rho_{ha})+V_{sh}\rho_{sh}+(1-\phi-V_{sh})\rho_{ma} \quad (A.3)$$

where
 $\rho_b=\rho$=measured (or bulk) density
 $S_{xo}$=flushed zone water saturation
 $\rho_{mf}$=density of the mud filtrate
 $S_{hr}$=residual hydrocarbon saturation
 $\rho_{ha}$=apparent density of the hydrocarbon
 $\rho_{sh}$=density of the shale matrix
 $\rho_{ma}$=density of the matrix
Therefore, if $$S_{xo}\rho_{mf}+S_{hr}\rho_{ha}=\rho_f,$$

then Equation (A.3) can be simplified to:

$$\rho=\phi\rho_f+(1-\phi-V_{sh})\rho_s+V_{sh}\rho_{sh} \quad (A.4)$$

where
 $\rho_f$=fluid density
 $\rho_s$=sand matrix density.
As the acoustic impedance of a medium $=\upsilon\rho=/\rho t$, where $\upsilon$=the interval velocity of the medium, we can combine Equations (A.2) and (A.4) to write the acoustic impedance-porosity equation as:

$$\rho\upsilon = \frac{\phi\rho_f + (1-\phi-V_{sh})\rho_s + V_{sh}\rho_{sh}}{\phi\Delta t_f + (1-\phi-V_{sh})\Delta t_s + V_{sh}\Delta t_{sh}} \quad (A.5)$$

When solving for porosity $$\phi = \frac{(1-V_{sh})(\rho_s - \rho\upsilon\Delta t_s) + V_{sh}(\rho_{sh} - \rho\upsilon\Delta t_{sh})}{\rho\upsilon(\Delta t_f - \Delta t_s) - (\rho_f - \rho_s)} \quad (A.6)$$

This equation can be generalized for other complex lithologies of two constituent matrix materials into:

$$\phi = \frac{(1-V_2)(\rho_1 - \rho\upsilon\Delta t_1) + V_2(\rho_2 - \rho\upsilon\Delta t_2)}{\rho\upsilon(\Delta t_f - \Delta t_1) - (\rho_f - \rho_1)}, \quad (A.7)$$

where
 $V_2$=percentage of minor constituent
 $\rho_1$=density of major constituent
 $\Delta t_1$=transit time of major constituent
 $\rho_2$=density of minor constituent
 $\Delta t_2$=transit time of minor constituent

APPENDIX B

The following is a more detailed discussion of the lithologic modeling process.

Refer to FIG. 2. Several prominent reflecting horizons stretch across section 48 generally dipping to the left end of the section. The reflecting horizons down to about 1.47 seconds are clearly defined and easy to follow. In a zone of interest outlined by the black rectangle between about 1.47 and 2.85 seconds and between seismic stations 8 and 52, the reflection exhibit a complex pattern. Horizon C appears to converge towards Horizon A and to possibly pinch out Horizon B. At about station 40 and beyond, a poorly-resolved low-frequency zone is seen.

As stated before, the purpose of this step in the process is to improve the resolution of that part of the seismic section 48 where the high-frequency portion of the seismic spectrum is missing such as the zone to the right of station 40. In essence, thin layers are inserted between Horizons A and C in the corresponding region of an initial, lithologic, hypothetical model. It would appear from the seismic section that at least two or three thin layers may remain between horizons A and C. From that model, synthetic seismic sections may be generated. The lithologic parameters of the respective layers as well as the arbitrarily-inserted thin layers will be systematically perturbed until the goodness of fit between the derived synthetic traces and the real seismic traces 48 reaches a desired value. The resulting more-detailed lithologic model will then be accepted. It is apparent that many other horizons within the zone of interest in FIG. 2 will require attention. The above discussion was confined to reflections A, B and C by way of example only.

Figure 8:
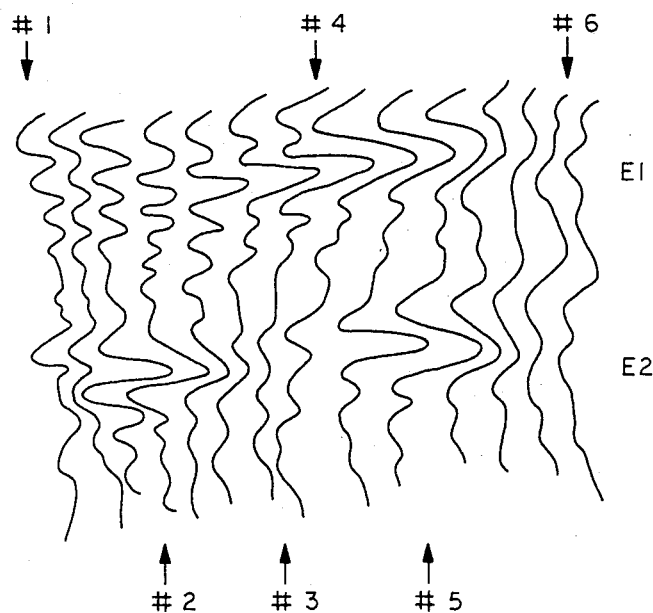
FIG. 8 illustrates a manner of selecting model control point.

Model control points shown in FIG. 8 are used to define a two-dimensional model by specifying that model in terms of only a few selective points. If the horizons were substantially monoclinal and uniform thickness, only two model control points, one at each end of the seismic section would be sufficient.

Between two layers such as $H_1$ and $H_2$ in FIG. 8, the interval velocity $V_{1j}$ and the density $Q_{1j}$ are assumed to be constant in the vicinity of each model point. There may be a lateral velocity gradient or a density gradient such that at MP2, the velocity and density have a different value $V_{1k}$ and $Q_{1k}$ and similarly for MP3 and MP4. Velocities and densities $V_{2j}$ and $Q_{2j}$ are established for the next layer between $H_2$ and $H_3$ and so on for the remaining layers and model points.

At this point, each thick layer may now be subdivided into a plurality of thinner layers initially having the same interval velocity and density. The number of thin layers may be chosen on the basis of general geologic knowledge of the area as was discussed for FIG. 2 above. Four exemplary sublayers $h_1$–$h_4$ are shown at the left end of the model of FIG. 8. Although four sublayers are shown, any number of sublayers may be assumed initially so long as the assumption is geologically reasonable. The sublayers have not been extended across the profile because that would have obscured certain details to be discussed later.

So far, a gross basic model of an area of interest has been provided. It now remains to correlate the proposed model with the seismic data itself.

The next step is to establish a set of calculation points $CP1(1=1,2,3,\ldots,n)$. Calculation points are locations along the surface of the earth where quantitative values will be assigned to certain rock properties or layer parameters of velocity V, and density Q, and to model parameters such as depth D, and number of sublayers, as well as a time-tie, $T_O$ (the phase relationship, in time between a model and a real seismic data).

Lateral reflection, amplitude changes often may be indicative of physical changes in one of the layer parameters listed above. For example, a series of very thin layers may pinch out and/or blend together to form a single interface. Because of the finite breadth of a seismic wavelet and because of the loss of high-frequency information due to earth or other filtering effects, the seismic wavelets due to very thin layers interfere with each other creating a low-amplitude interference pattern. As the layers pinch out or combine into a single interface, the amplitude of a seismic wavelet due to that new, merged interface develops.

Figure 9:
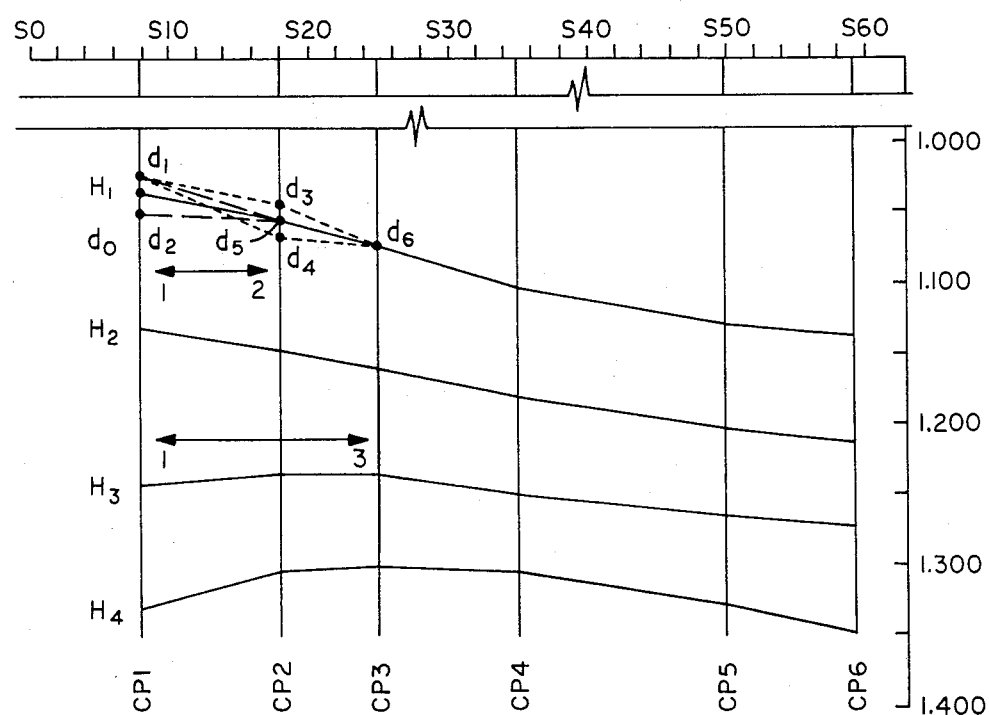
FIG. 9 shows a criteria for selecting calculation points.

In FIG. 9 calculation points CP1–CP6, selected on the basis of significant seismic-trace amplitude changes, are plotted on the model at their proper positions relative to the model points MP1–MP4. A calculation point does not necessarily correspond to a seismic trace. Calculation points are usually positioned within a lateral zone of interest as shown by arrow A–A', They are not necessarily distributed along the entire model.

At each calculation point, the initial parameters for each layer are found by interpolation between adjacent model points as shown by the dash lines. By way of example, but not by way of limitation, the interpolation algorithm may be linear. Depth to major boundaries $H_1$–$H_4$ as well as depths to thin layers h1–h4 are considered. The other parameters of velocity and density are interpolated at each calculation point for the major boundaries but not for the individual thin layers because initially these thin layers are assumed to have constant velocity intensity within a given thick layer. Thus, initial values for CP1 and CP2 are found by interpolation between model points MP1 and MP2. Similarly, we proceed to the other calculation points. Above boundary $H_1$ and beneath boundary $H_4$, a homogenous halfspace is presumed.

From the initial interpolated parameters at each calculation point, a reflectivity series is created. The reflectivity coefficient $R_n$ for a given interface is defined by the following expression:

$$R_n = (Q_n D_n - Q_{n+1} V_{n+1})/(Q_n V_n + Q_{n+1} V_{n+1}) \quad (1)$$

where
 $Q_n$ is the density above interface n,
 $Q_{n+1}$ is the density beneath interface n,
 $V_n$ is ther interval velocity above interface n, and
 $V_{n+1}$ is the interval velocity beneath interface n.

Figure 11:
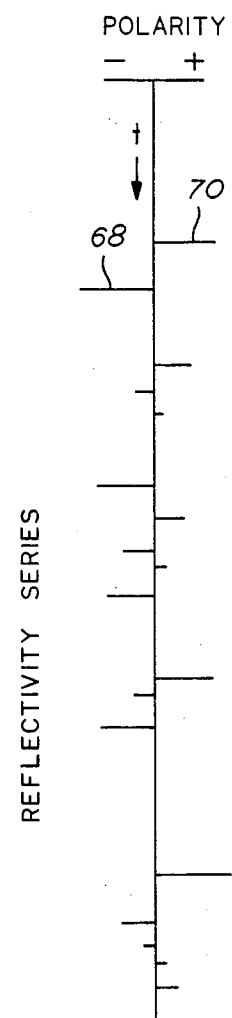
FIG. 11 is a reflectivity series derived from a calculation point.

FIG. 11 is an illustration of an exemplary reflectivity series. Each spike, such as 68 and 70, marks an interface across which a parameter change in Q and/or V occurs. The polarity, plus or minus, depends on the relative values of Q and/or V between the upper and lower layers. The length of the spike is a function of $R_n$.

A synthetic seismic trace is calculated at each of the seismic stations by convolving the reflectivity series for that station with the desired wavelet. The parameters of a seismic wavelet may be specified initially by the geophysicist or may be generated by the computer, using the initial parameters for each calculation point.

The synthetic seismic traces resulting from the convolution process are compared with the real seismic traces at the corresponding seismic stations. The synthetic seismic traces are time-shifted relative to the real traces until the sum square differences between the real and the synthetic traces is a minimum. At that time, the wavelet is accepted.

This far, we have created an initial geologic model for a limited-depth portion of a two-dimensional seismic structural section. Model control points have been established at points of structural inflection (slope change). Calculation points were positioned along the section where lateral, significant changes in reflection character are observed. A series of thin beds have been interpolated between thick-layered boundaries. A desired wavelet envelope has been selected.

It now remains to systematically perturb the parameters of the reflective layers during each of a priority of a duration to achieve best fit between synthetic and real traces. The ultimate purpose is, of course, to predict and replace missing high-frequency seismic data to improve resolution of the initial two-dimensional geologic hypothesis.

For the initial iteration, based upon interpolation between calculation points of a synthetic seismic trace is produced for each seismic station by convolving the accepted seismic wavelet with the reflectivity series as defined in each station by interpolation of parameters between successive calculation points.

The synthetic traces are then compared with the real seismic traces to find the degree of correspondence, that is, the best goodness of fit, such as the minimum of the sum of over all traces of the sum-square differences, b, where for each trace $$b = \frac{1}{n} {}^j (A_1 - qA_{1+j})^2 \quad (3)$$

$$1 = 1$$

where
 A is the real seismic trace samples,
 A is the synthetic trace samples,
 n is the number of samples in the time window,
 i is the running sample index, i=1,2,3, ..., n,
 j is the shift index, j=0, 1, 2, ..., k, and
 q is the normalizing coefficient Referring back to FIG. 9, we begin the first iteration after the initial processing by changing, for example, the depth parameters for horizon $H_1$ at calculation point CP1. First we reduced the depth of $H_1$, as shown by the upper dash-line, to $d_1$. The incremental change in depth is small, 10 to 20 feet. The change in depth 1 is linearly interpolated for all traces within the zone of influence (arrow 1-2) of the change, in this case the zone of influence is from CP1 to CP2. Synthetic traces are computed and the average sum-square difference, $B_{avg}$, is determined for all the traces within the zone of influence. If $B_{avg}^{new}$ is less than $b_{avg}^{old}$ as determined from the initial iteration, the change is accepted; if not, a new change is tried by increasing the depth parameter to $d_2$. A second $b_{avg}^{new}$ is determined, if $b_{avg}^{new}$ is less than $b_{avg}^{old}$, the change is accepted and $b_{avg}^{new}$ replaces $b_{avg}^{old}$. If $b_{avg}^{new}$ is greater than $b_{avg}^{old}$, the original depth $d_0$ is accepted and we progress along the same layer $H_1$ to the next calculation point CP2.

For purposes of example, assumed that CP2 a perturbation in depth $d_2$ horizon $H_1$, produce the best fit. At CP2, the zone of influence extends from CP1 to CP3 (arrow 1-3). At CP2, the depth of parameter for Horizon $H_1$ is perturbed to $d_3$ relative to $d_2$ at CP1 and $d_5$, the initial depth parameter for $H_1$ and CP3.

Synthetic traces are computed on the average minimum square-difference $b_{avg}$ calculated for all traces within the zone of interest as shown by the dotted lines 64, 66. If $d_3$ is not found acceptable, a new depth $d_4$ of the opposite polarity is tried. If that depth is unacceptable, the initial depth $d_5$ is retained as a depth parameter for horizon $H_1$ and CP2.

The above process is repeated for horizon $H_1$ at the remaining calculation points CP3-CP6. At each successive calculation point, the chosen parameter is perturbed relative to the last acceptable perturbation at calculation points on each side of the calculation point under consideration.

The above steps are repeated for each calculation point, for every layer and for every desired parameter of depth, velocity, and density.

Figure 10:
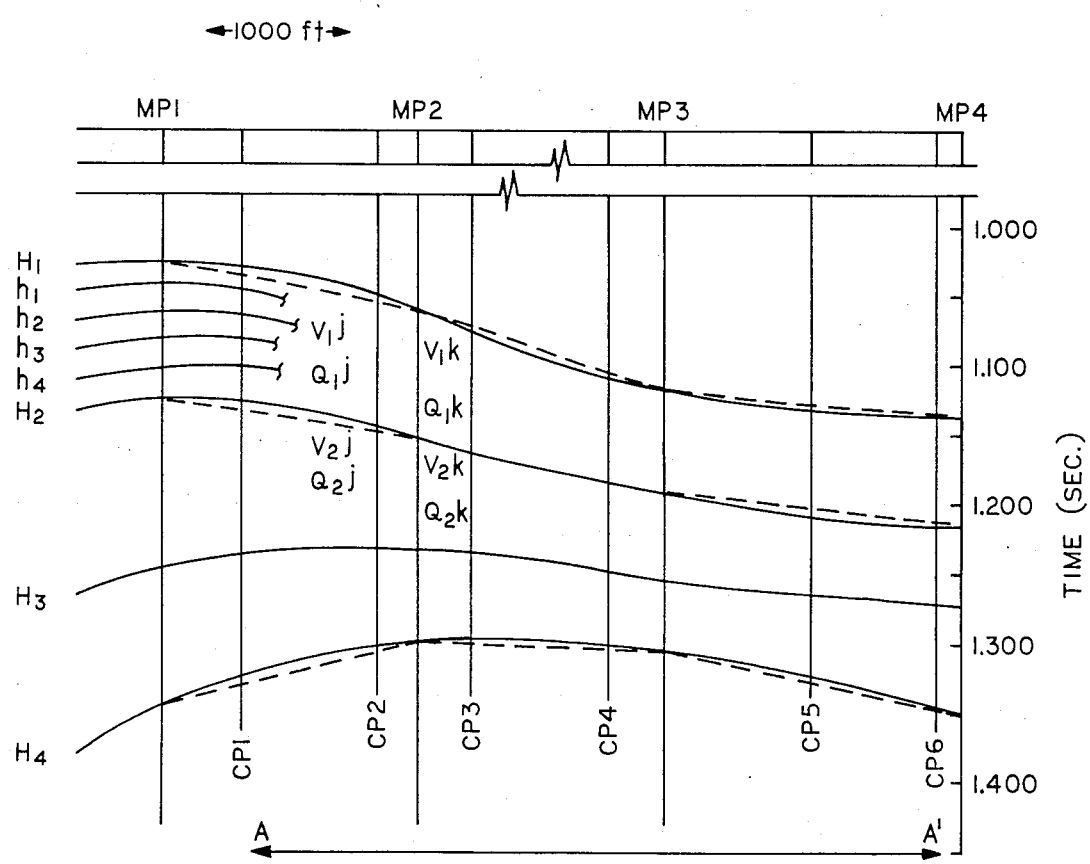
FIG. 10 illustrates calculation points after interpolation of layer parameters between adjacent model points.

In the example of FIGS. 9 and 10, four major layer boundaries were assumed with several thin sublayers beings interpolated within the thick areas. After a few iterations, the final structure detail of FIG. 2 will emerge. The procedure in attempting to find the best fit between synthetic and real seismic traces, as the capability from merging two or more layers together to create a sophisticated configuration for the final display of figures such as pinch-outs.

After a new geologic (lithologic) model has been completed for every layer, and after every parameter has been systematically perturbed by one discrete increment during a first iteration, a second iteration may be performed. The iterative process may be continued until the correlation coefficients can no longer be minimized. Usually, after a user-specified number of iterations has been accomplished, such as 7, the process is terminated resulting in the lithologic model such as shown in FIG. 4.

We claim as our invention:

1. A method for estimating the porosity of a subsurface interval of the earth, comprising the steps of:
   (a) gathering seismic data from the subsurface interval, the seismic data consisting of a plurality of seismic samples representing a plurality of locations along the surface of the earth;
   (b) deriving an acoustic model of the subsurface interval, from the seismic samples;
   (c) assigning an average acoustic impedance value for each of said plurality of seismic samples in said acoustic model, using data from available well control;
   (d) calculating a predicted porosity value for each average acoustic impedance value according to the expression:

$$\phi_1 = \frac{(1 - V_2)(\rho_1 - \rho v \Delta t_1) + V_2(\rho_2 - \rho v \Delta t_2)}{\rho v (\Delta t_f - \Delta t_1) - (\rho_f - \rho_1)}$$

where
$\phi_1$ is the calculated porosity;
$\rho v$ is the average acoustic impedance of the inverval;
$V_2$ is a percentage of minor matrix constituents in the subsurface interval;
$\rho_1$ is a density of major matrix constituents comprising the subsurface interval;
$\Delta t_1$ is a transit time of a seismic signal in the major matrix constituents;
$\rho_2$ is a density of the minor matrix constituents;
$\Delta t_2$ is a transit time of the seismic signal in the minor matrix constituents;
$\rho_f$ is a density of the fluid; and
$\Delta t_f$ is a transit time of the seismic signal in the fluid of the interval;
   (e) calibrating the predicted porosity value with welllog and core-derived data; and
   (f) plotting or displaying the predicted porosity values for each modeled seismic location.

2. A method for calculating porosity as defined by claim 1, wherein the step of assigning an acoustic impedance value for each of said plurality of seismic data samples, comprises the steps of:
   (a) generating a lithologic model of the subsurface interval, said lithologic model derived from said plurality of seismic data samples;
   (b) assigning a first set of rock properties and model parameters to said lithologic model and generating a plurality of synthetic seismic traces;
   (c) measuring the goodness of fit between said plurality of synthetic seismic traces and the corresponding previously gathered seismic data samples;
   (d) systematically perturbing said first set of rock properties and model parameters in said lithologic model;
   (e) generating new synthetic seismic traces after said systematic perturbation until there is found a best fit between the synthetic data samples;

3. The method for calculating porosity as recited in claim 2, wherein the density variables $P_s$, $P_{sh}$, and $P_f$ are constants derived from well log data taken from the subsurface interval.

4. The method according to claim 3, wherein the transit time variables $t_s$, $t_{sh}$, and $t_f$ are determined from the well data.

5. The method according to claim 1, further comprising the step of calculating a corrected porosity by crossplotting well-log porosity and predictable porosity values.

* * * * *